United States Patent Office 3,261,761
Patented July 19, 1966

3,261,761
METHOD OF FREEZE DRYING BACTERIAL CULTURES
Arthur W. Anderson, Corvallis, Oreg., assignor, by mesne assignments, to the United States of America as represented by the Secretary of the Navy
No Drawing. Filed May 7, 1962, Ser. No. 193,027
3 Claims. (Cl. 195—96)

The present application is a continuation in part of my co-pending application Serial No. 704,844, filed December 23, 1957, and now abandoned.

The invention relates to a method for freeze drying of bacterial cultures.

Prior art methods for the freeze drying of bacterial cultures are known. Certain methods are reported, for example, in an article entitled, "The Survival of Bacteria During and After Drying," by Fry and Greaves in the Journal of Hygiene, Volume 49, pages 220–246, and in an article entitled, "An Improved Procedure and Apparatus for Preservation of Sera, Microorganisms and other Substances—the Cryochem-Process," by Flosdorf and Mudd in the Journal of Immunology, Volume 34, pages 469–490.

Typical prior art methods have produced variable results, often with a low survival percentage of bacteria. Commonly the prior art methods have been carried out by rapid freezing to very low temperature using washed cell suspensions. These methods usually involve a great amount of work when a large volume of cells are to be preserved.

An object of the present invention is to provide a method for producing freeze dried bacterial cultures which will produce a much higher survival rate of viable cells.

Other objects and many of the attendant advantages of this invention will be readily appreciated as the same becomes better understood by reference to the following detailed description.

In carrying out the method of this invention cells are grown in any suitable medium, preferably using the best medium for the particular genus and species. The method of this invention is applicable to most pathogenic bacteria commonly studied in laboratories such as, for example: *Pasteurella pestis, Brucella melitensis, Pseudomonas pseudomallei,* and also to commonly studied non-pathogenic bacteria such as *Serratia marcescens.* A soluble metallic chloride is added to this growth medium so that the growth medium contains a minimum of about 0.5% of, for example, NaCl. The salt is added to facilitate the freeze drying and to favor the growth of the culture. Sodium chloride in an amount as little as .1% up to an amount of 2.0% has been found satisfactory, and it is believed that amounts in excess of this latter would also be satisfactory, depending on the particular species of bacteria. Other soluble metallic salts such, for example, as calcium chloride and magnesium chloride have been found to work.

Cells are cultured, preferably within their optimum temperature range, until they reach the maximum stationary phase, preferably the beginning of this phase. The culture is then diluted with a buffer and a sugar in such a manner that it is at the optimum pH for the species, usually between pH 5 and 8, and contains between about 1% and about 50% sugar with an optimum 3% based on lactose. Ordinarily the buffer which is used is sodium phosphate which is commonly a mixture of $Na_2HPO_4$ and $NaH_2PO_4$ which is made by starting out with $NaH_2PO_4$ and adding sufficient NaOH to obtain the proper pH. As mentioned, when lactose is used, a 3% concentration is optimum. When other sugars are substituted for lactose, the optimum concentration may differ and can readily be found by experiment.

For best results the diluted culture is pre-cooled slowly toward freezing temperature, the optimum length of time required for this operation being approximately five hours. One convenient way of accomplishing this slow pre-cooling is by putting the culture into, for example, 60 ml. army-type vaccine bottles (chosen because they are inexpensive) and then setting the bottles in a pan of salt water and putting the pan in a deep freeze. This slows down the cooling of the culture since it cannot approach freezing until all the surrounding water in the pan has approached freezing. The freezing temperature of the culture is about $-1°$ C. or $-2°$ C. The pre-cooling step should be carried out to reduce the temperature to $0°$ C. to $+1°$ C. within a period of about 5 hours.

One principal purpose, according to the invention, of the slow pre-cooling is to avoid a sudden substantial drop in temperature as the culture passes through its freezing point where it changes from a liquid to a solid. For example, it is considered undesirable to slowly pre-cool the culture down to, say, $10°$ C. and then, by any means, as, for example, the application of vacuum hereinafter described, suddenly rapidly lower the temperature through the freezing point down to, say, $-5°$ C. Rather, the slow pre-cooling should be used to bring the temperature of the culture down close to freezing. The precise permissible upper limit of the temperature at the end of this pre-cooling step has not been determined since it is not essential to the practice of the invention. However, it has been determined that it is certainly satisfactory to bring the culture temperature down by slow pre-cooling to a temperature not exceeding its freezing temperature by more than about $2°$ C. The slow pre-cooling can, if desired, be continued to the extent that the temperature of the culture is brought down to its freezing temperature. The pre-cooling can be continued still further so that the culture freezes and further yet, if desired, so that its temperature drops below its freezing temperature.

At or near the freezing point the containers with the cell mixture are attached to a vacuum apparatus, the pan of water is removed, and a vacuum is applied which rapidly evacuates and thus freezes the culture and removes dissolved gases. During the evacuation process the bottles are surrounded by an ambient such as a cabinet or a room at ordinary room temperature, for example. One typical method of evacuating the container of the culture is to connect the vaccine bottle through tubing running through a hole in a rubber cork plugging the bottle to a vacuum apparatus providing a vacuum of perhaps twenty microns of mercury. Sometimes a pressure as low as ten microns of mercury has been used but the process can probably be accomplished at pressures as high as 100 microns. In a typical case it takes from 5 to 10 minutes to reach the desired low temperature at the beginning of the freeze drying period. This low temperature should lie within about the range of between $-5°$ C. and $-35°$ C., as ultimate limits. The preferred optimum region within which the desired low temperature should lie is between about $-12°$ C. and about $-30°$ C. During the entire process of the invention the temperature of the culture should never be allowed to drop below the aforementioned minimum of about $-35°$ C. With an ambient at about room temperature there is relatively little heat conduction into the culture during the initial freeze drying so that the principal thing controlling the low temperature to be reached is the rate of evacuation. The low temperature is reached by virtue of the fact that the vacuum causes the moisture in the culture to sublime and the heat of sublimation is extracted from the culture, thus lowering the temperature of the culture. At the beginning of the freeze drying, when the vacuum is first applied to a bottle containing the culture, there is a rapid decrease in temperature as the moisture is promptly sublimed. Having reached the low temperature, preferably within the aforementioned range of about −12° to about −30° C., the culture remains at essentially this temperature so long as the pressure is maintained essentially constant and the rate of flow of heat into the culture from the ambient is matched by the rate of heat loss from the culture in the form of the heat of sublimation. As less and less moisture is left in the culture, the low temperature cannot be maintained even though the vacuum remains applied to the bottle. When most of the moisture has been removed by the initial sublimation, substantially no more moisture can be extracted out of the culture at the same vacuum as long as the temperature remains low. When the stage has been reached at which essentially all the available moisture has been sublimed out at the low temperature, this can readily be detected since with a typical good pump the vacuum will suddenly increase (i.e. the pressure may drop to perhaps 1 micron of mercury) and conduction of heat from the air surrounding the bottle causes the temperature of the culture suddenly to begin to rise. The temperature rises gradually up to the temperature of the ambient. This ambient surrounding the culture container during sublimation may be at standard room temperature, or for example, at 35° C. The upper limit of the temperature for the ambient during this step in the process has not been determined since it is not essential to the practice of the invention. However, it is considered that a temperature as high as 60° C. would be undesirable. In any event the temperature of the ambient should be chosen to avoid thawing during the stage of the process in which, as previously described, moisture is to be removed by sublimation.

The next step is the application of that vacuum and heat which will produce the desired dried cultures without cellular death and damage. The optimum temperature is about 35° C., with a maximum of about 60° C. After the last desired amount of moisture is removed by an application of heat and vacuum, the culture containers are sealed and permitted to return to room temperature at which time they are ready for storage.

Obviously many modifications and variations of the present invention are possible in the light of the above teachings. It is therefore to be understood that within the scope of the appended claims, the invention may be practiced otherwise than as specifically described.

What is claimed is:

1. A method of freeze drying bacterial cultures to produce a higher survival rate of viable cells consisting in growing bacterial cells in a suitable medium in the presence of 0.1 to 2.0% of a salt selected from the group consisting of sodium chloride, calcium chloride, and magnesium chloride until a culture is obtained wherein said cells are at their maximum stationary cultural phase, diluting said culture with a buffer and 1 to 50% of a sugar solution at a pH of 5 to 8, slowly pre-cooling said diluted culture to a temperature of 0° C. to +1° C., during a period of about 5 hours, then subjecting said pre-cooled culture to a vacuum to cause the temperature to drop to about −5° C. to −35° C., maintaining said culture at said temperature of −5° C. to −35° C. to keep the culture frozen and to cause sublimation of moisture therefrom, the temperature of said culture being prevented from descending below −35° C., and allowing said temperature to rise to 35° C. to 60° C. as said culture becomes dry due to the sublimation of said moisture.

2. The method of claim 1 wherein said salt is NaCl in the amount of 0.5% by weight, said buffer is sodium phosphate, and said sugar is present in amount of 3% by weight.

3. The method of claim 1 wherein, after said culture is essentially free of moisture, said culture is heated under vacuum to a temperature between 35° C. and 60° C. to produce a dried culture without cellular damage, and subsequently allowing the temperature of said dried culture to come to room temperature.

References Cited by the Examiner

"Journal of Immunology," Vol. 50, pp. 21, 24 to 26 and 34 (1945).

Naylor et al. "Journal of Bacteriology," Vol. 52, pages 565 to 573 (1946).

Porter, Bacterial Chemistry and Physiology, pp. 195 and 196, published by John Wiley & Sons, New York (1946).

A. LOUIS MONACELL, *Primary Examiner.*

ABRAHAM H. WINKELSTEIN, *Examiner.*

A. E. TANENHOLTZ, *Assistant Examiner.*